US012635668B2

(12) United States Patent
Gardner

(10) Patent No.: US 12,635,668 B2
(45) Date of Patent: May 26, 2026

(54) SNUFFLE TOY

(71) Applicant: Casadirect Limited, Ballymena (GB)

(72) Inventor: Paul Gardner, Ballymena (GB)

(73) Assignee: CASADIRECT LIMITED, Ballymena (GB)

( * ) Notice: Subject to any disclaimer, the term of this patent is extended or adjusted under 35 U.S.C. 154(b) by 0 days.

(21) Appl. No.: 18/742,961

(22) Filed: Jun. 13, 2024

(65) Prior Publication Data

US 2024/0415097 A1    Dec. 19, 2024

(30) Foreign Application Priority Data

Jun. 14, 2023    (GB) ..................................... 2308903

(51) Int. Cl.
A01K 15/02        (2006.01)

(52) U.S. Cl.
CPC .................................. A01K 15/025 (2013.01)

(58) Field of Classification Search
CPC ......................... A01K 15/025; A41D 27/20–40
USPC ............................................................ 2/253
See application file for complete search history.

(56) References Cited

U.S. PATENT DOCUMENTS 7,621,235 B2 * 11/2009 Genitrini .............. A01K 15/025
                                                    119/706
11,206,813 B2 * 12/2021 Jeong ................... A01K 15/025

2009/0286026 A1 * 11/2009 Lux-Bellus ............ A01K 1/035
                                                    428/85
2012/0060766 A1    3/2012 Brandon
2013/0277511 A1 * 10/2013 Wendling ............. A01K 15/026
                                                    248/176.1
2016/0330935 A1 * 11/2016 Vesterholt ............ A01K 1/0157

FOREIGN PATENT DOCUMENTS

| KR | 20160093577 A | * | 8/2016 | .......... A01K 15/025 |
| KR | 20210012443 A | | 2/2021 | |
| KR | 20220002274 U | * | 9/2022 | |
| WO | WO-2012/106521 A2 | | 8/2012 | |
| WO | WO-2015/173840 | | 11/2015 | |

OTHER PUBLICATIONS

"My Dogs Favorite Toy Looks Like a Salad Bowl (and Costs Less Than Sweetgreen)", The Strategist, Conaboy, Nov. 18, 2020, [online] Available from: https://nymag.com/strategist/article/snuffie-bowl-feeding-matreview.html Accessed Jul. 11, 2024.
"Towel Enrichment: How to Fold Towels to and Create Mentally Stimulating Puzzles for Dogs" (With Videos) [ online] Bindis bucket list, Dec. 17, 2020, Available from: https://www.bindisbucketlist.com/post/towelenrichment-how-to-fold-towels-to-create-mentally-stimulating-puzzlesfor- dogs; Accessed Jul. 11, 2024.

(Continued)

*Primary Examiner* — Christopher D Hutchens
*Assistant Examiner* — Nevena Aleksic
(74) *Attorney, Agent, or Firm* — Foley & Lardner LLP

(57) ABSTRACT

A snuffle toy for retaining or concealing items such as dog toys or treats comprises a body portion and one or more snuffle features. The snuffle toy is formed of a sheet of material such that the body portion and the one or more snuffle features 3 are integrally formed. The snuffle toy is configured to be folded, rolled and/or tied.

15 Claims, 10 Drawing Sheets

(56)            References Cited

OTHER PUBLICATIONS

Everybody RelaxImHere, 2020, "More advanced towel food game?" Reddit [online] Available from: https://www.reddit.com/r/ Dogtraining/ comments/krcuts/comment/gi9fo6i/ Accessed: Jul. 11, 2024 See comment made by EverybodyRelaxImHere regarding adding pockets to a towel.
Search Report dated Nov. 8, 2024, received in Patent Application No. GB2308903.0.

* cited by examiner

1

1

1

1

1

1

SNUFFLE TOY

CROSS-REFERENCE TO RELATED APPLICATIONS

This application is a Paris Convention of GB 2308903.0, filed Jun. 14, 2023, which is incorporated by reference in its entirety.

TECHNICAL FIELD

The present invention relates to a snuffle toy. Particularly, the present invention relates to a snuffle toy for training or entertaining dogs and/or retaining or concealing items such as dog toys or treats.

BACKGROUND

Pet owners are increasingly concerned with the physical and emotional well-being of the animals in their care. For example, dog owners often look for ways to mentally stimulate their dogs, aiming to provide a suitable level of cognitive exertion which will 'keep them busy', for example during times when their owners are otherwise engaged or at work. There is a growing body of scientific research exploring the benefits of such mental stimulation and enrichment for dogs. These studies have highlighted the positive impact of enrichment activities on a dog's cognitive abilities, behaviour and overall well-being. Suitable enrichment activities include teaching new tricks and games, providing puzzles and offering other interactive toys. While the dog toys of the prior art can be used for enrichment activities they are often very simple and will either require regular interaction by the owner in order to be exciting for the dog (e.g. throwing a ball) and/or will be of limited complexity and cannot be used to sustain a dog's long-term interest. Furthermore, existing dog toys and games have a mono-utility i.e. a single form of use, meaning that their complexity cannot be adjusted for dogs having different levels of intelligence or training. There exists a need for improved ways to provide the mental and physical stimulation that dogs need for their overall well-being.

In many countries, pet ownership increased significantly during the Covid-19 pandemic. During this period many people spent more time at home due to lockdowns and other restrictions. For many, this was an opportune time to bring a new pet into their lives. However, the subsequent easing of restrictions and the return-to-work of many pet owners has caused significant 'separation anxiety' for animals that are used to having their owners at home for the majority of time. Dogs in particular can suffer from separation anxiety, which can lead to destructive and anti-social behaviours. Dog behaviourists, trainers, and veterinarians widely advocate enrichment activities to reduce separation anxiety and to provide mental stimulation. There exists a need for ways to reduce separation anxiety and provide mental stimulation for dogs.

SUMMARY OF THE INVENTION

According to a first aspect of the invention there is provided a snuffle toy for retaining or concealing items such as dog toys or treats, the snuffle toy comprising a body portion and one or more snuffle features, wherein the snuffle toy is formed of a sheet of material such that the body portion and the one or more snuffle features are integrally formed, and wherein the snuffle toy is configured to be folded, rolled and/or tied. Advantageously, the snuffle toy can be used in enrichment activities to provide the mental and physical stimulation that dogs need for their overall well-being.

Optionally the snuffle toy is formed of a single sheet of material.

Optionally the sheet of material is a quick-dry microfiber material. Advantageously, the use of thin, quick-dry microfiber material ensures hygiene and durability.

Optionally the sheet of material comprises polyester.

Optionally the sheet of material is 70-100% polyester.

Optionally the sheet of material is 88% polyester.

Optionally the sheet of material comprises polyamide.

Optionally the sheet of material is 0-30% polyamide.

Optionally the sheet of material is 12% polyamide.

Optionally the sheet of material is a polyester/polyamide blend.

Advantageously, the material is absorbent and quick dry.

Optionally the sheet of material is a sheet of fabric.

Optionally the sheet of material is a single sheet of fabric.

Optionally the sheet of material comprises at least one layer of fabric.

Optionally the sheet of material consists of one layer of fabric.

Optionally the sheet of material comprises a plurality of layers of fabric.

Optionally the body portion is configured to receive, retain and/or conceal one or more items such as dog toys or treats.

Optionally the or each of the one or more snuffle features are configured to receive, retain and/or conceal one or more items such as dog toys or treats.

Optionally the snuffle toy is at least 50 cm wide.

Optionally the snuffle toy is 50-90 cm wide.

Preferably the snuffle toy is 72 cm wide.

Optionally the snuffle toy is at least 100 cm long.

Optionally the snuffle toy is 100-120 cm long.

Preferably the snuffle toy is 105 cm long.

Optionally the sheet of material is at least 50 cm wide.

Optionally the sheet of material is 50-90 cm wide.

Preferably the sheet of material is 72 cm wide.

Optionally the sheet of material is at least 100 cm long.

Optionally the sheet of material is 100-180 cm long.

Preferably the sheet of material is 128 cm long.

Optionally the sheet of material is less than 1 cm thick.

Preferably the sheet of material is less than 0.5 cm thick.

Optionally the snuffle toy is configured to be folded, rolled and/or tied. Advantageously, folding, rolling and/or tying the snuffle toy acts to retain and/or conceal one or more items such as dog toys or treats.

Optionally the snuffle toy is configured to be folded.

Optionally the snuffle toy is configured to be rolled.

Optionally the snuffle toy is configured to be tied in a knot, for example an overhand knot.

Optionally the shape and configuration of the snuffle toy allows the snuffle toy to be folded, rolled and/or tied in a knot.

Preferably the snuffle toy comprises a plurality of snuffle features. By 'snuffle features' it is meant features which can be used to accommodate and/or conceal items such as dog toys or treats.

Optionally the body portion and the one or more snuffle features are unitarily formed.

Optionally the snuffle toy comprises a plurality of snuffle features. Advantageously, snuffle features provide places where one or more items such as dog toys or treats can be retained and/or concealed.

Optionally the one or more snuffle features comprises at least one pocket for retaining items such as dog toys or treats.

Optionally the one or more snuffle features comprises a plurality of pockets.

Optionally the snuffle features comprise at least one single sided pocket.

Optionally the snuffle features comprise a plurality of single sided pockets.

Optionally the snuffle features comprise a row of single sided pockets.

Optionally the row of single sided pockets extends across the full width of the snuffle toy.

Optionally the or each single sided pocket is located at a peripheral end of the snuffle toy.

Optionally the or each single sided pocket is configured to allow items such as dog toys or treats to be retained on the front side or the rear side of the snuffle toy.

Optionally the or each single sided pocket comprises an opening.

Optionally the or each single sided pocket comprises an opening located on the front side or the rear side of the snuffle toy.

Optionally the or each single sided pocket is formed by one fold in the sheet of material.

Optionally the or each single sided pocket is formed by two lines of stitching.

Optionally the or each single sided pocket is formed by two lines of stitching which extend part way along the length of the snuffle toy.

Optionally the or each single sided pocket is at least 10 cm wide.

Preferably the or each single sided pocket is 14-15 cm wide.

Optionally the or each single sided pocket has a depth of at least 5 cm.

Optionally the or each single sided pocket has a depth of 5-20 cm.

Preferably the or each single sided pocket has a depth of 11 cm.

Optionally the snuffle features comprise at least one dual sided pocket.

Optionally the snuffle features comprise a plurality of dual sided pockets.

Optionally the snuffle features comprise a row of dual sided pockets.

Optionally the row of dual sided pockets extends across the full width of the snuffle toy.

Optionally the or each dual sided pocket is located at or towards a central portion of the snuffle toy.

Optionally or each dual sided pocket is located away from a peripheral end of the snuffle toy.

Optionally the or each dual sided pocket is configured to allow items such as dog toys or treats to be retained on the front side and the rear side of the snuffle toy.

Optionally the or each dual sided pocket comprises a pocket on the front side of the snuffle toy and a pocket on the rear side of the snuffle toy.

Optionally the or each dual sided pocket comprises two openings.

Optionally the or each dual sided pocket comprises a front opening located on the front side of the snuffle toy and a rear opening located on the rear side of the snuffle toy.

Optionally the or each dual sided pocket comprises two folds which create a pocket on the front side of the snuffle toy and a pocket on the rear side of the snuffle toy.

Optionally the pocket on the front side of the snuffle toy and the pocket on the rear side of the snuffle toy are coincident.

Optionally the or each dual sided pocket is formed by two folds in the sheet of material.

Optionally the or each dual sided pocket is formed by two lines of stitching.

Optionally the or each dual sided pocket is formed by two lines of stitching which extend part way along the length of the snuffle toy.

Optionally the or each dual sided pocket is at least 10 cm wide.

Preferably the or each dual sided pocket is 14-15 cm wide.

Optionally the or each dual sided pocket has a depth of at least 5 cm.

Optionally the or each dual sided pocket has a depth of 5-20 cm.

Preferably the or each dual sided pocket has a depth of 8 cm.

Optionally the or each dual sided pocket is located at least 90 cm from a peripheral end of the snuffle toy.

Optionally the snuffle features comprise at least a snuffle row.

Optionally the snuffle features comprise a plurality of snuffle rows.

Optionally the or each snuffle row comprises a plurality of loops.

Optionally the or each snuffle row comprises a plurality of adjacent loops.

Optionally the or each snuffle row comprises a line of stitching.

Optionally the or each snuffle row comprises a straight line of stitching.

Optionally the or each snuffle row extends across the full width of the snuffle toy.

Optionally the or each snuffle row comprises a plurality of cuts in the sheet of material.

Optionally, for the or each snuffle row, the line of stitching is perpendicular to the plurality of cuts in the sheet of material.

Optionally the or each snuffle row extends along a linear direction.

Optionally the or each snuffle row is located at or towards a central portion of the snuffle toy.

Optionally the or each snuffle row is at least 50 cm wide.

Optionally the or each snuffle row is 50-90 cm wide.

Preferably the or each snuffle row is 72 cm wide.

Optionally the or each snuffle row is at least 2 cm in height.

Optionally the or each snuffle row is 2-8 cm in height.

Preferably the or each snuffle row is 4 cm in height.

Optionally the gap between neighbouring snuffle rows is at least 2 cm.

Optionally the gap between neighbouring snuffle rows is 2-8 cm.

Preferably the gap between neighbouring snuffle rows is 4 cm.

Optionally the or each snuffle row is located away from a peripheral end of the snuffle toy.

Optionally the or each snuffle row is located 40-70 cm from a peripheral end of the snuffle toy.

Optionally the or each snuffle row is located at least 54 cm from a peripheral end of the snuffle toy.

According to a further aspect of the invention there is provided a snuffle toy for retaining or concealing items such as dog toys or treats, the snuffle toy comprising a body portion and one or more snuffle features, wherein the snuffle toy is configured to be folded, rolled and/or tied. Advantageously, the snuffle toy provides owners with a mentally and physically stimulating activity for their dog that is adaptable to the individual needs and intellect of the dog.

According to a further aspect of the invention there is provided a method of forming a snuffle toy for retaining or concealing items such as dog toys or treats, the method comprising: providing a sheet of material; and forming a body portion and one or more integrally formed snuffle features by folding, sewing and/or cutting the sheet of material. Advantageously, the method involves forming a snuffle toy from a sheet of material, resulting in a greatly simplified manufacturing process compared to processes where multiple parts must be brought together and assembled.

Optionally the method comprises forming a plurality of snuffle features.

Optionally the method comprises forming a plurality of snuffle features, wherein the snuffle features comprise one or more single sided pockets, one or more dual sided pockets and/or one or more snuffle rows.

Optionally the method comprises forming at least one single sided pocket, wherein forming at least one single sided pocket comprises:

folding the sheet of material along a fold line such that a first portion of material overlaps a second portion of material; and sewing the folded sheet of material along at least two lines of stitching such that the first portion of material is attached to the second portion of material, the pocket is formed between the first portion of material and the second portion of material, and the pocket is formed between the at least two lines of stitching.

Optionally the two lines of stitching are parallel.

Optionally an angle exists between the lines of stitching and the fold line.

Optionally the angle between the lines of stitching and fold line is 90 degrees.

Optionally the method comprises forming at least one dual sided pocket, wherein forming at least one dual sided pocket comprises:

folding the sheet of material along a first fold line such that a first portion of material overlaps a second portion of material;

folding the sheet of material along a second fold line such that the second portion of material overlaps a third portion of material; and sewing the folded sheet of material along at least two lines of stitching such that the first, second and third portions are attached, a first pocket is formed between the first portion of material and the second portion of material, a second pocket is formed between the second portion of material and the third portion of material, and each pocket of material is formed between the at least two lines of stitching.

Optionally the two lines of stitching are parallel.

Optionally an angle exists between the lines of stitching and the fold lines.

Optionally the angle between the lines of stitching and fold lines is 90 degrees.

Optionally the method comprises forming at least one snuffle row, wherein forming at least one snuffle row comprises:

folding the sheet of material along a fold line such that a first portion of material overlaps a second portion of material;

sewing the folded sheet of material along one line of stitching such that the first portion of material is attached to the second portion of material and a loop is formed by the first portion of material and the second portion of material; and cutting the sheet of material along at least one cut line.

Optionally the fold line and the line of stitching are parallel.

Optionally an angle exists between the line of stitching and the cut line.

Optionally the angle between the line of stitching and the cut line is 90 degrees.

Optionally forming at least one snuffle row comprises cutting the sheet of material along a plurality of cut lines.

Optionally the snuffle toy is a folded, rolled and/or tied snuffle toy.

Optionally the snuffle toy comprises is tied into an overhand knot.

BRIEF DESCRIPTION OF THE DRAWINGS

The invention will be described by way of example only referring to the figures, in which.

DETAILED DESCRIPTION

Figure 1:
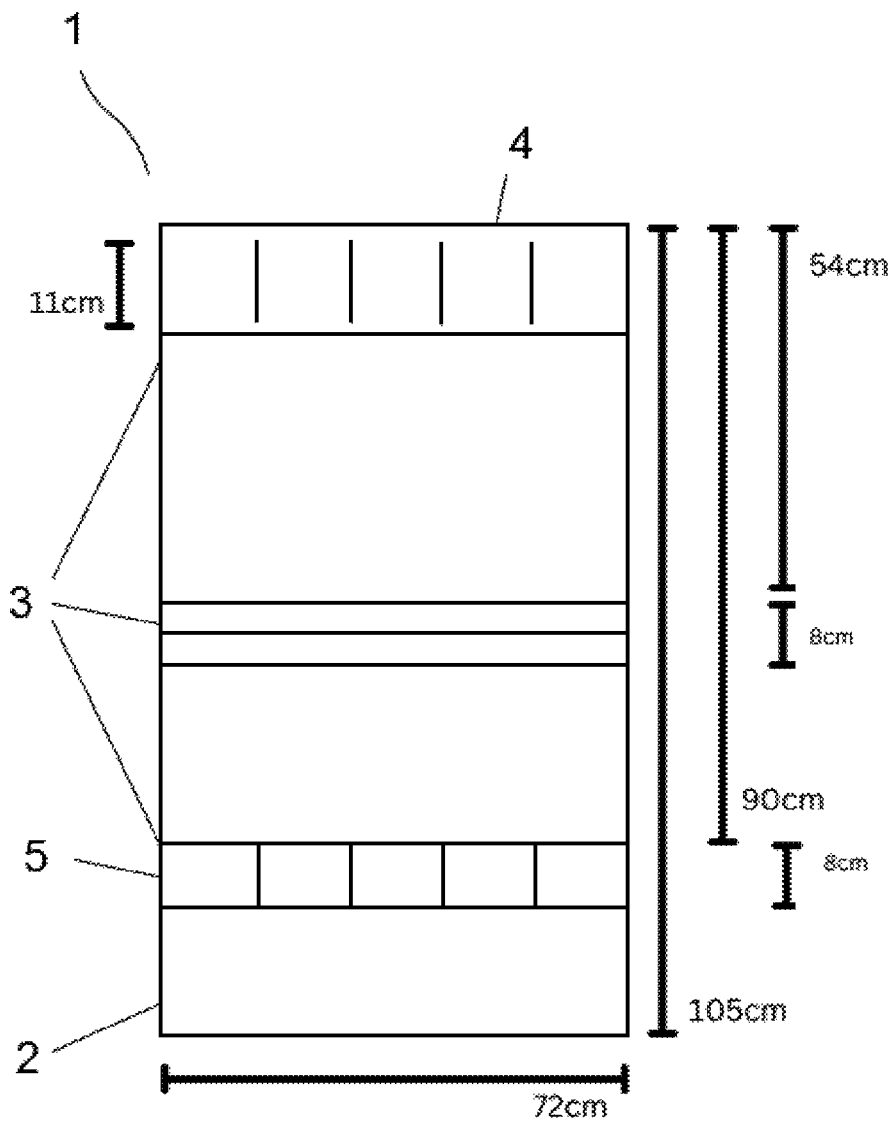
FIG. 1 shows a top view of a snuffle toy according to an aspect of the invention.

FIG. 1 shows a snuffle toy 1 according to an embodiment of the invention. The snuffle toy 1 can be used for retaining or concealing items such as dog toys or treats, and can be used in enrichment activities to provide the mental and physical stimulation that dogs need for their overall well-being. By 'dog treats' it is meant snacks or other dietary supplements such as biscuits which can be given and fed to dogs.

Figure 2:
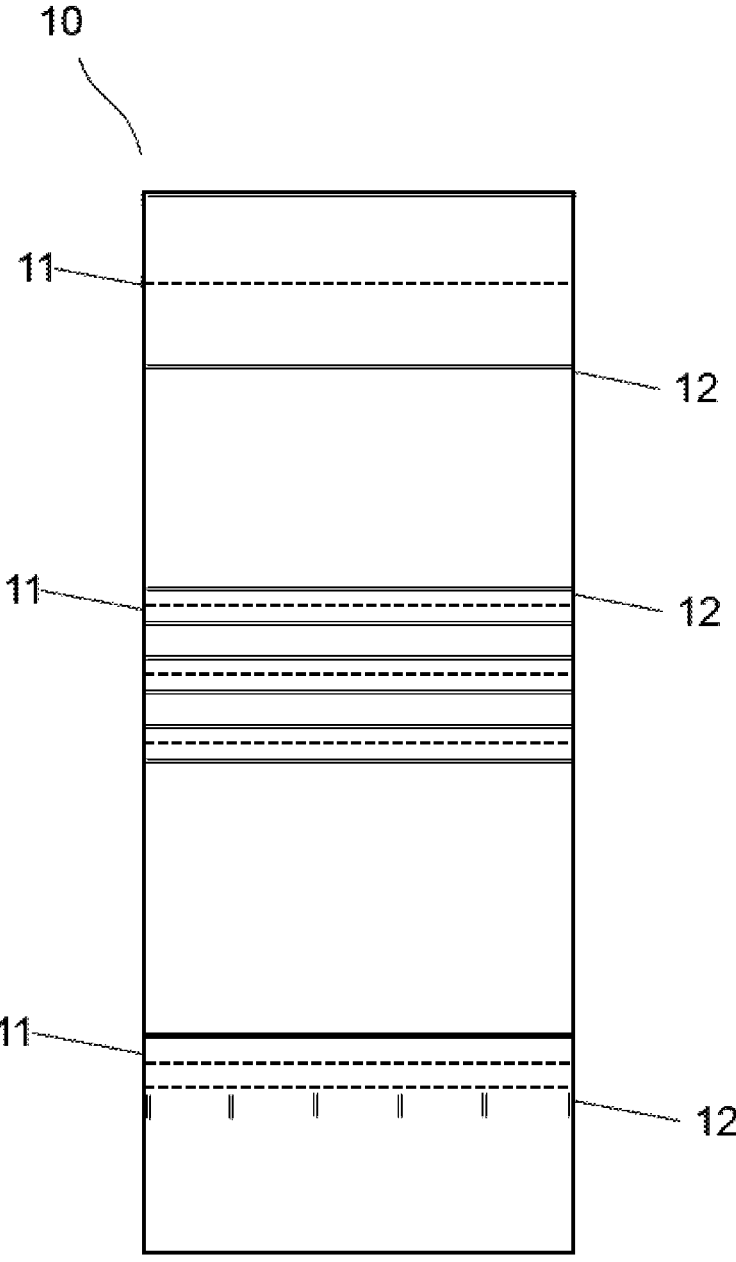
FIG. 2 shows a top view of a sheet for forming a snuffle toy according to an aspect of the invention.

As shown in FIG. 1, the snuffle toy 1 comprises a body portion 2 and a plurality of snuffle features 3. The snuffle toy 1 is formed of a sheet of material 10 (shown in FIG. 2) such that the body portion 2 and the snuffle features 3 are integrally formed. The sheet of material 10 used for forming the snuffle toy 1 is a polyester micro-fibre blend material (typically used in quick dry towels). In this example the sheet of material 10 is 88% polyester and 12% polyamide, but the sheet of material 10 may be any suitable polyester/polyamide blend comprising 70-100% polyester and 0-30% polyamide, for example 100% polyester. This material is absorbent but quick dry and generally smooth. Therefore the material is hygienic to use as when washed there will be no remnants of dog food left between fibres. The material is also suitably thin and therefore allows the snuffle toy 1 to be folded and/or formed into a tight roll and knot, in use. The sheet of material 10 can be folded along fold lines 11, sewn along lines of sewing 12 and cut along cut lines to form the snuffle toy 1.

The snuffle toy 1 being made from a single sheet of material 10 makes it more robust than previous solutions. In particular, the snuffle features 3 are integrally or unitarily formed with the body 2 of the snuffle toy 1 such that one continuous sheet of material 10 provides both the snuffle features 3 and the body 2. This means that the snuffle features 3 are less likely to be separated from the remainder of the body 2 during use. For example, tearing or ripping lines of sewing used to form the snuffle features 3 will not result in loose scraps of material becoming separated from the body 2, which would present a swallowing or choking hazard. This is particularly advantageous for larger, more powerful dogs that are capable of tearing or damaging stitching, and also makes the snuffle toy 1 more durable. Even if all the stitching used in the snuffle toy 1 becomes damaged or ripped then the result will be a single sheet of material.

The snuffle toy 1 is configured to be folded, rolled and/or tied. In particular, the shape, dimensions and configuration of the snuffle toy 1 allows the snuffle toy 1 to be folded and/or rolled and then tied in a knot, for example an overhand knot, in use. The snuffle toy 1 is at least 50 cm wide and at least 100 cm long, for example 50-90 cm wide and 100-120 cm long. In the preferable embodiment shown in FIG. 1, the snuffle toy 1 is 72 cm wide and 105 cm long. The snuffle toy 1 is formed of a single sheet of material 10 that has been folded, cut and sewn to form the arrangement shown in FIG. 1. The sheet of material 10 is at least 50 cm wide, at least 100 cm long and less than 1 cm thick, for example 50-90 cm wide, 100-180 cm long and less than 0.5 cm thick. In the preferable example shown in FIG. 2, the sheet of material 10 is 72 cm wide, 128 cm long and less than 0.5 cm thick. The sheet of material 10 is a single sheet of fabric and consists of one layer of fabric. The snuffle features 3 are of appropriate dimensions (i.e. not too long, wide or thick) so that they do not prevent the folding, rolling and tying of the snuffle toy 1, in use. The dimensions above have been carefully chosen to ensure that the snuffle toy 1 can be folded, rolled and tied in an overhand knot after it has been rolled.

The body portion 2 is configured to receive, retain and/or conceal one or more items such as dog toys or treats. In particular, dog toys or treats can be placed on the body portion 2 when the snuffle toy 1 is in a planar configuration (see FIGS. 1 and 3). Each snuffle feature 3 is also configured to receive, retain and/or conceal one or more items such as dog toys or treats. In particular, dog toys or treats can be placed on or in a respective snuffle feature 3 when the snuffle toy 1 is in a planar configuration (see FIGS. 1 and 3). After the snuffle toy 1 is subsequently folded, rolled and/or tied the dog toys or treats will be concealed within the snuffle toy 1. As is explained in further detail below, the snuffle toy having both a body portion 2 and a collection of snuffle features 3 allows the level of difficulty provided to a dog to be adjusted.

The snuffle toy 1 comprises a plurality of snuffle features 3. By 'snuffle features' it is meant features which can be used to accommodate and/or conceal items such as dog toys or treats. Snuffle features 3 provide places where one or more items such as dog toys or treats can be retained and/or concealed, and can increase difficulty of retrieving said items, in use. In the embodiment shown in FIG. 1 the snuffle features 3 comprise a plurality of single sided pockets 4, a plurality of dual sided pockets 5 and a plurality of snuffle rows 6.

Figure 3:
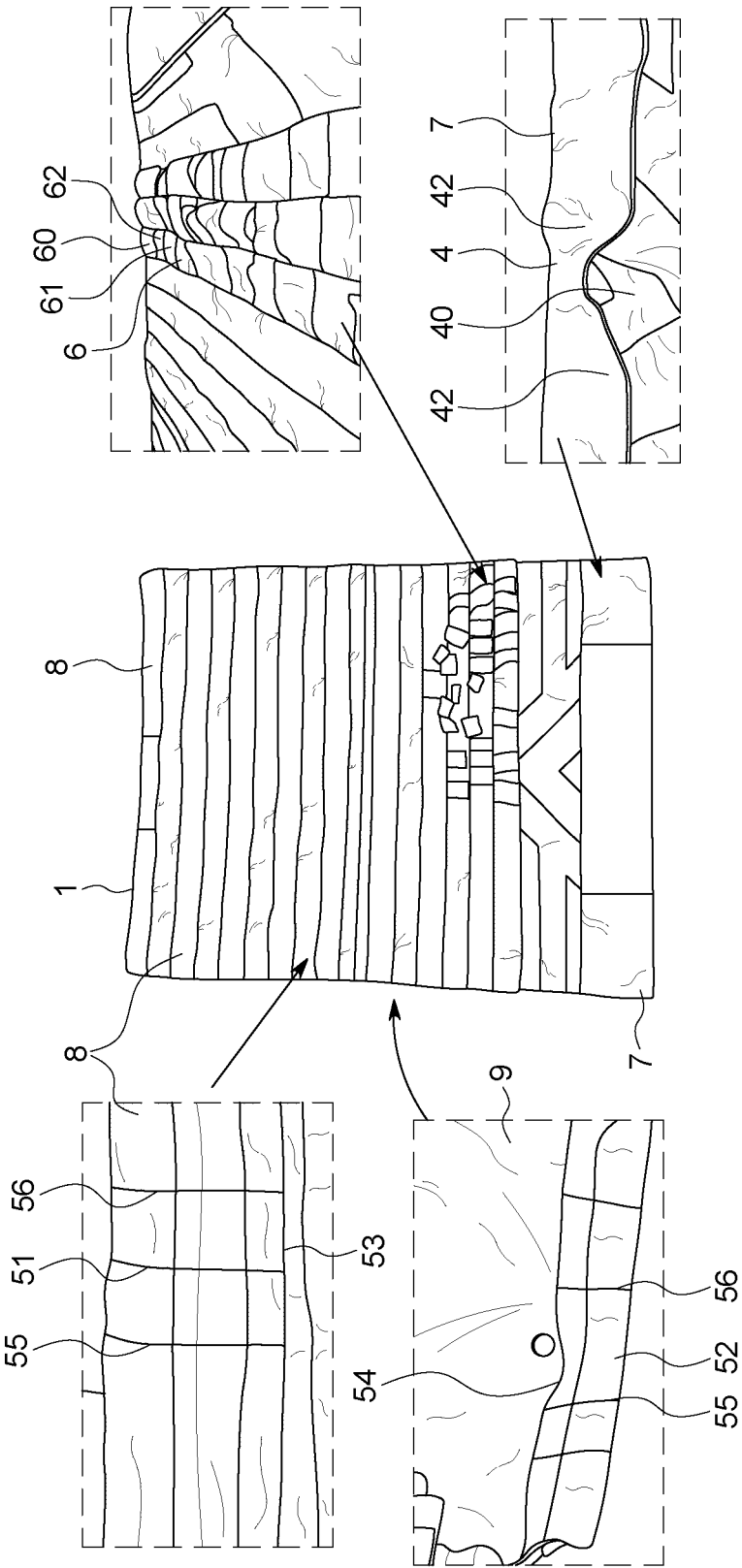
FIG. 3 shows multiple perspective detail views of a snuffle toy according to an aspect of the invention.
Figure 4:
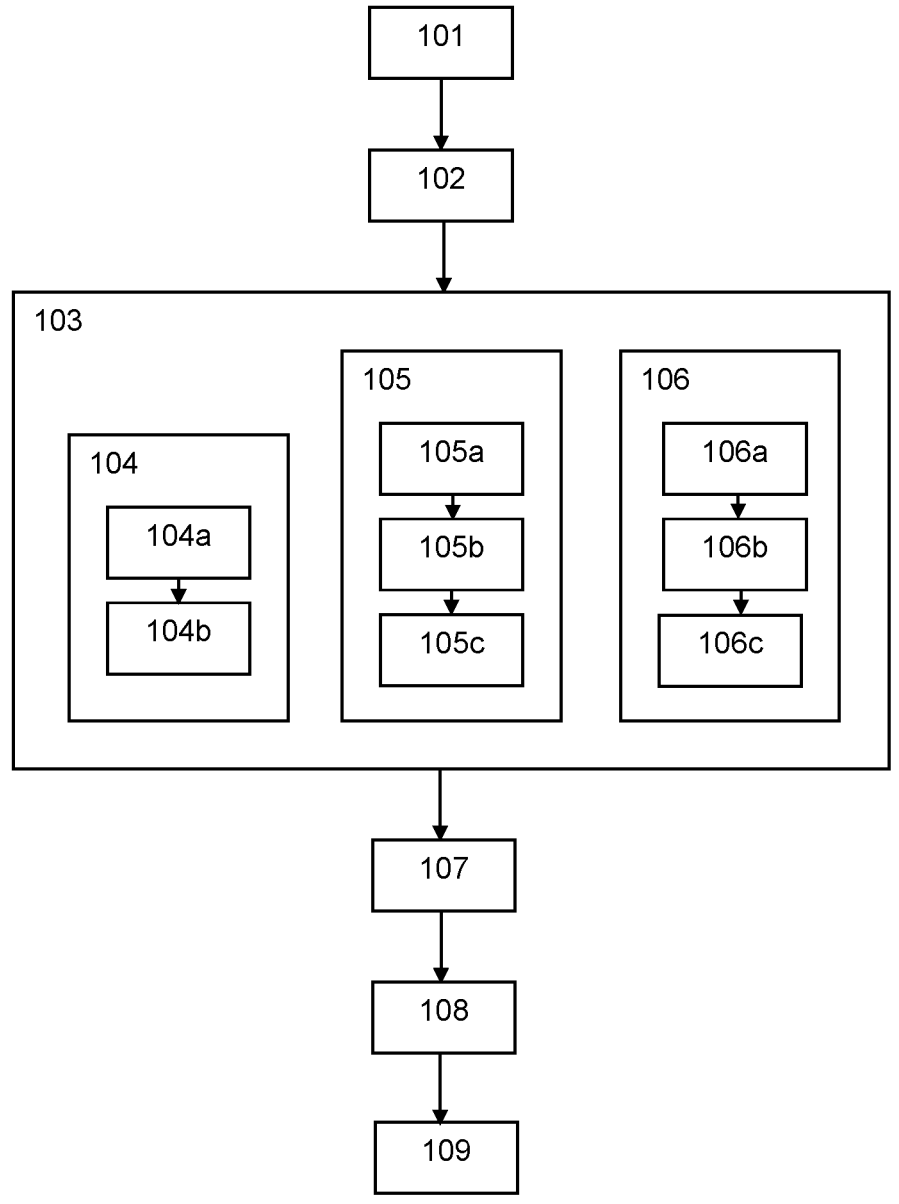
FIG. 4 shows a method according to an aspect of the invention.
Figure 5:
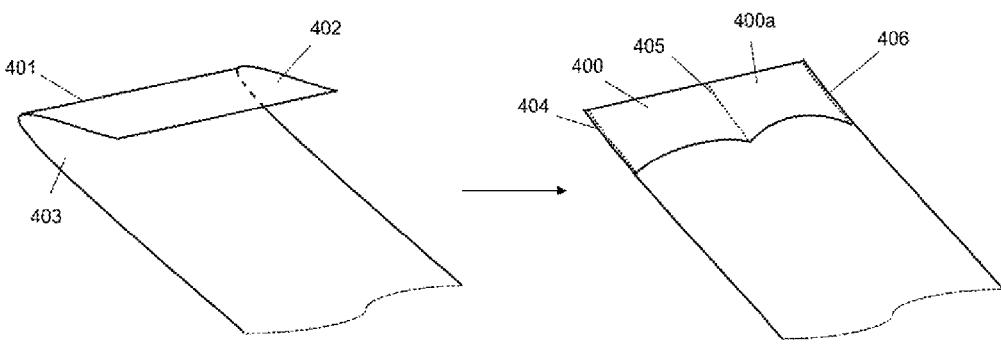
FIG. 5 shows perspective views of forming a single sided pocket.
Figure 6:
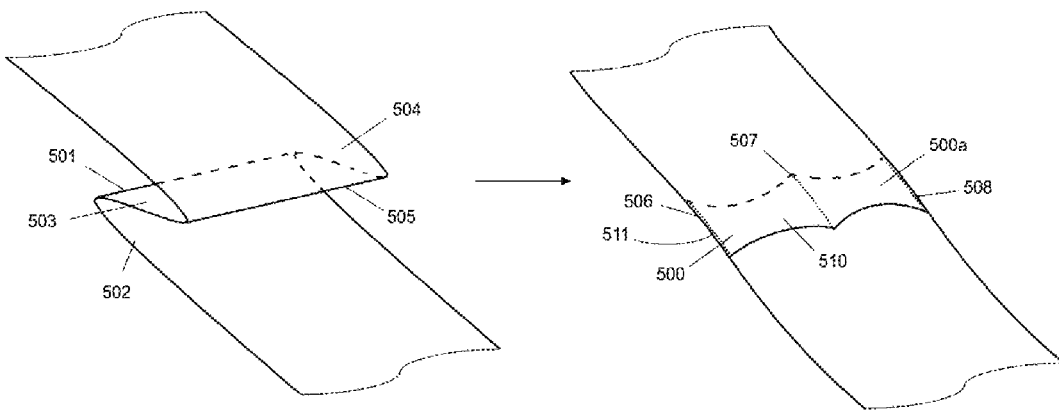
FIG. 6 shows perspective views of forming a dual sided pocket.

As shown in FIG. 3, the snuffle toy 1 comprises a row of single sided pockets 4. The row of single sided pockets 4 extends across the full width of the snuffle toy 1. Each single sided pocket 4 is located at a peripheral end 7 of the snuffle toy 1. Each single sided pocket 4 is configured to allow items such as dog toys or treats to be retained on the front side 8 of the snuffle toy 1. Each single sided pocket 4 comprises an opening 40 located on the front side 8 of the snuffle toy 1. Each single sided pocket 4 is formed by one fold in the sheet of material 10 and two lines of stitching 42 which extend part way along the length of the snuffle toy 1. Each single sided pocket is at least 10 cm wide and has a depth of at least 5 cm, for example of 5-20 cm. In the most preferred embodiments, each single sided pocket is 14-15 cm wide and has a depth of 11 cm.

The snuffle toy 1 comprises a row of dual sided pockets 5. The row of dual sided pockets 5 extends across the full width of the snuffle toy 1. Each dual sided pocket 5 is located at or towards a central portion of the snuffle toy 1 and away from a peripheral end 7 of the snuffle toy 1. Each dual sided pocket 5 is configured to allow items such as dog toys or treats to be retained on the front side 8 and the rear side 9 of the snuffle toy 1. Each dual sided pocket 5 comprises a pocket 51 on the front side 8 of the snuffle toy 1 and a pocket 52 on the rear side 9 of the snuffle toy 1. Each dual sided pocket 5 comprises two openings: a front opening 53 located on the front side 8 of the snuffle toy 1 and a rear opening 54 located on the rear side 9 of the snuffle toy 1. Each dual sided pocket 5 comprises two folds which create a pocket 51 on the front side 8 of the snuffle toy 1 and a pocket 52 on the rear side 9 of the snuffle toy 1. The pocket 51 on the front side 8 of the snuffle toy 1 and the pocket 52 on the rear side 9 of the snuffle toy 1 are coincident.

Each dual sided pocket 5 is formed by two folds in the sheet of material 10 and two lines of stitching 55, 56 which extend part way along the length of the snuffle toy 1. Each dual sided pocket is at least 10 cm wide and has a depth of at least 5 cm, for example of 5-20 cm. In the most preferred embodiments, each dual sided pocket is 14-15 cm wide and has a depth of 8 cm. Each dual sided pocket is located at least 90 cm from a peripheral end 7 of the snuffle toy 1.

The snuffle toy 1 comprises three snuffle rows 6. Each snuffle row 6 extends across the full width of the snuffle toy 1 along a linear direction. Each snuffle row 6 comprises a plurality of loops 60 adjacent to one another in a row. Each snuffle row comprises a straight line of stitching 61 and a plurality of cuts 62 in the sheet of material 10. For each snuffle row 6, the line of stitching 61 is perpendicular to the plurality of cuts 62 in the sheet of material 10. Each snuffle row is located at or towards a central portion of the snuffle toy 1 and away from a peripheral end 7 of the snuffle toy 1. Each snuffle row is at least 50 cm wide and at least 2 cm in height, for example 50-90 cm wide and 2-8 cm in height.

The gap between neighbouring snuffle rows is at least 2 cm, for example 2-8 cm. In the most preferred embodiments, each snuffle row is 72 cm wide and 4 cm in height, the gap between neighbouring snuffle rows is 4 cm and each snuffle row is located 40-70 cm from a peripheral end of the snuffle toy, for example at least 54 cm from a peripheral end of the snuffle toy 1.

Figure 7:
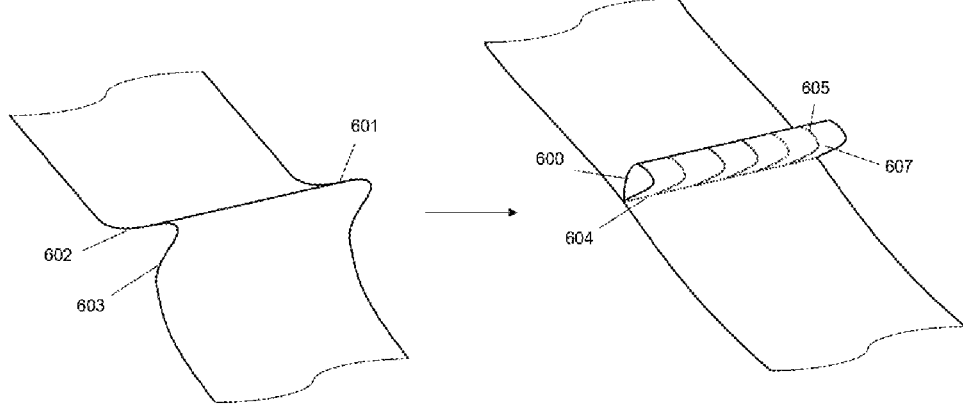
FIG. 7 shows perspective views of forming a snuffle row.

FIG. 7 discloses a method 100 according to an embodiment of the invention. The method 100 includes forming a snuffle toy 1 for retaining or concealing items such as dog toys or treats. In particular, the method 100 comprises: providing a sheet of material 10 (step 101); cutting or trimming the sheet of material to an appropriate size (step 102); and forming a body portion 2 and one or more integrally formed snuffle features 3 by folding, sewing and/or cutting the sheet of material 10 (step 103). Optionally, the method 100 further comprises placing one or more items on or in the snuffle toy 1 (step 107); rolling the snuffle toy (step 108); and tying the snuffle toy (step 108). The method 100 involves forming a snuffle toy 1 from a single sheet of material 10, resulting in a greatly simplified manufacturing process compared to processes where multiple parts must be brought together and assembled.

In step 101 a single sheet of material 10 is provided. The single sheet of material 10 is a sheet of fabric. In optional step 102 the single sheet of material 10 is cut to an appropriate size and/or shape ready for folding, sewing and/or cutting. For example, the size and shape shown in FIG. 2 may be used. To prevent fraying of the material, stitching or glue may be provided around the peripheral edge of the sheet 10 in step 102.

In step 103 a plurality of snuffle features 3 are formed from the single sheet of material 10. The snuffle features 3 comprise one or more single sided pockets 4, one or more dual sided pockets 5 and/or one or more snuffle rows 6. In the most preferred embodiments, the snuffle features comprise a row of single sided pockets 4, a row of dual sided pockets 5 and three snuffle rows 6.

Figure 8:
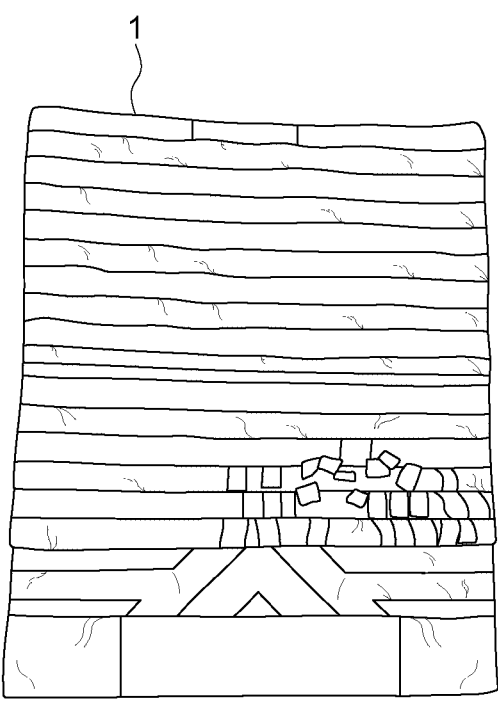
FIG. 8 shows a perspective view of the snuffle toy according to an aspect of the invention.

In preferred embodiments the method 100 comprises forming at least one single sided pocket 4 (step 104). FIG. 8 shows an example of forming an example single sided pocket 400. The single sided pocket 400 is generally similar to the single sided pockets 4 previously disclosed.

As shown in FIG. 8, forming a single sided pocket 400 comprises: folding the sheet of material 10 along a fold line 401 such that a first portion of material 402 overlaps a second portion of material 403 (step 104*a* in FIG. 7); and sewing the folded sheet of material 10 along two lines of stitching 404, 405 such that the first portion of material 402 is attached to the second portion of material 403 (step 104*b* in FIG. 7). Once sewn, the pocket 400 is formed between the first portion of material 402 and the second portion of material 403, and between the lines of stitching 404, 405. Providing a further line of stitching 406 creates a second pocket 400*a*. In preferred embodiments the lines of stitching 404, 405, 406 are parallel and the angle between the lines of stitching 404, 405, 406 and fold line 401 is 90 degrees.

Figure 9:
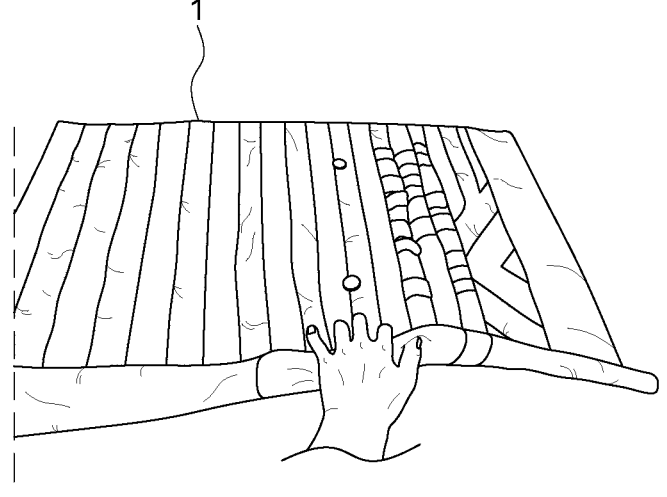
FIG. 9 shows a further perspective view of the snuffle toy according to an aspect of the invention.

Returning to FIG. 7, in preferred embodiments the method 100 comprises forming at least one dual sided pocket 5 (step 105). FIG. 9 shows an example of forming an example dual sided pocket 500. The dual sided pocket 500 is generally similar to the dual sided pockets 5 previously disclosed.

As shown in FIG. 9, forming a dual sided pocket 500 comprises: folding the sheet of material 10 along a first fold line 501 such that a first portion of material 502 overlaps a second portion of material 503 (step 105*a* in FIG. 7); folding the sheet of material 10 along a second fold line 505 such that the second portion of material 503 overlaps a third portion of material 504 (step 105*b* in FIG. 7); and sewing the folded sheet of material 10 along two lines of stitching 506, 507 such that the first, second and third portions 502, 503, 504 are attached (step 105*c* in FIG. 7). Once sewn, a first pocket 510 is formed between the first portion of material 502 and the second portion of material 503, a second pocket 511 is formed between the second portion of material 503 and the third portion of material 504, and each pocket 510, 511 is formed between the two lines of stitching 506, 507. Providing a further line of stitching 508 creates a second pocket 500*a*. In preferred embodiments the lines of stitching 506, 507, 508 are parallel and the angle between the lines of stitching 506, 507, 508 and fold lines 501, 505 is 90 degrees.

Figure 10:
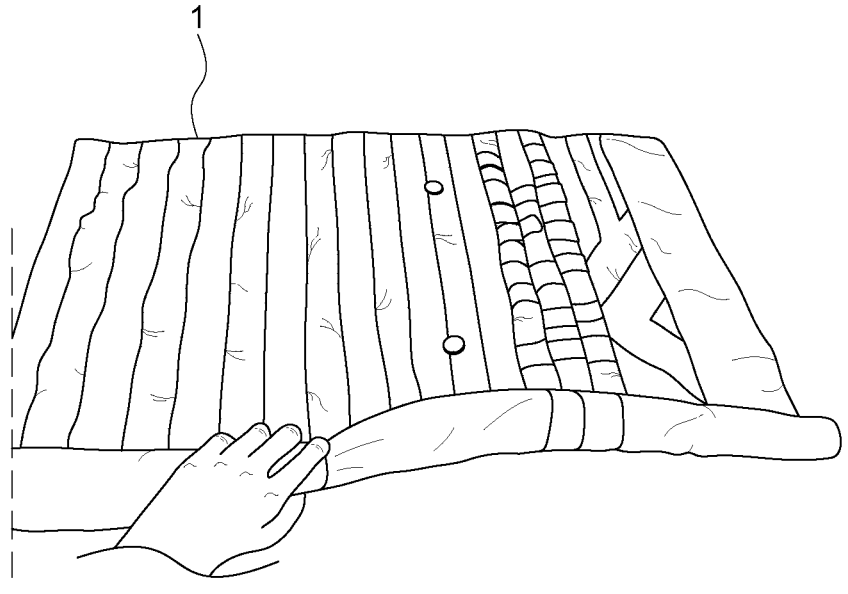
FIG. 10 shows a further perspective view of the snuffle toy according to an aspect of the invention.
Figure 11:
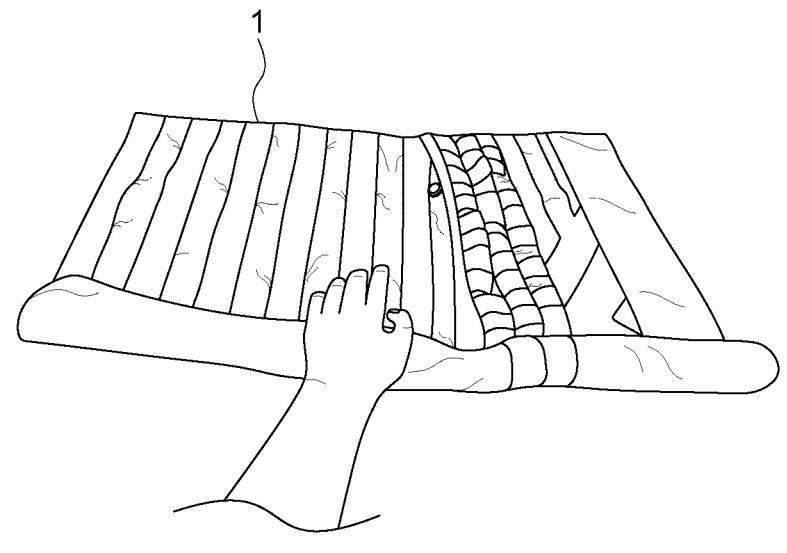
FIG. 11 shows a further perspective view of the snuffle toy according to an aspect of the invention.
Figure 12:
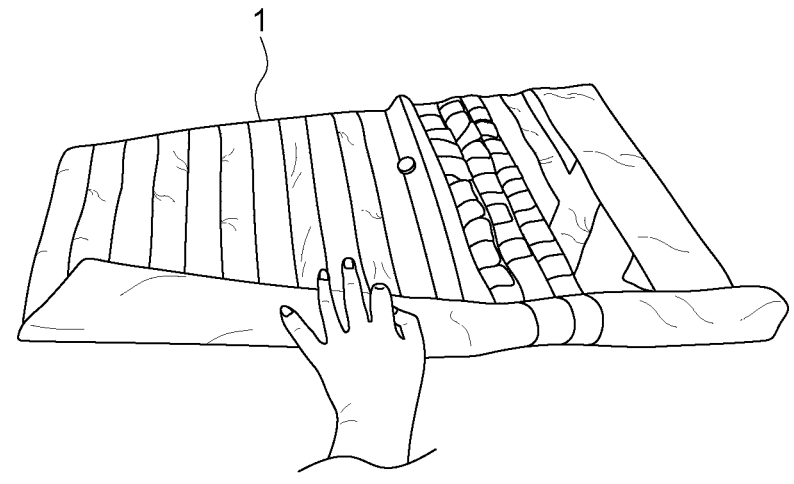
FIG. 12 shows a further perspective view of the snuffle toy according to an aspect of the invention.
Figure 13:
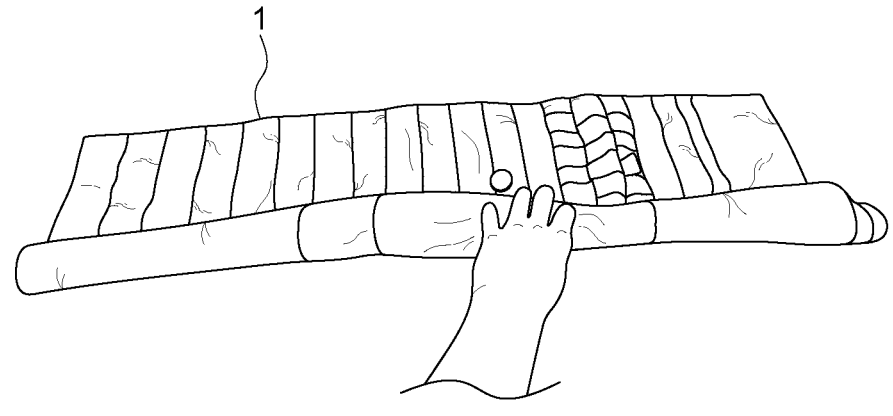
FIG. 13 shows a further perspective view of the snuffle toy according to an aspect of the invention.
Figure 14:
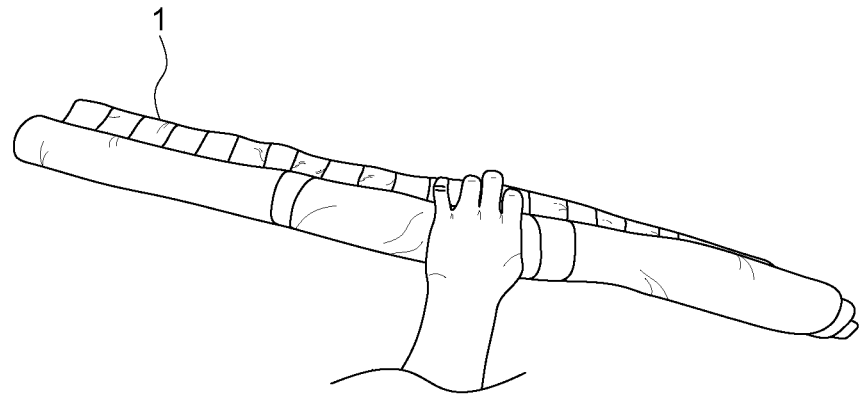
FIG. 14 shows a further perspective view of the snuffle toy according to an aspect of the invention.
Figure 15:
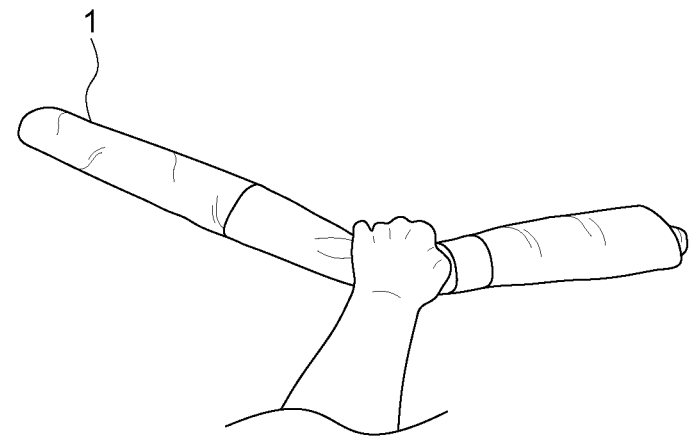
FIG. 15 shows a further perspective view of the snuffle toy according to an aspect of the invention.

Returning to FIG. 7, in preferred embodiments the method 100 comprises forming at least one snuffle row 6 (step 106). FIG. 10 shows an example of forming an example snuffle row 600. The snuffle row 600 is generally similar to the snuffle row 6 previously disclosed.

As shown in FIG. 10, forming a snuffle row 600 comprises: folding the sheet of material 10 along a fold line 601 such that a first portion of material 602 overlaps a second portion of material 603 (step 106*a* in FIG. 7); sewing the folded sheet of material 10 along one line of stitching 604 such that the first portion of material 602 is attached to the second portion of material 603 and a loop is formed by the first portion of material 602 and the second portion of material 603 (step 106*b* in FIG. 7); and cutting the sheet of material 10 along at least one cut line 605 (step 106*c* in FIG. 7). Cutting the sheet of material 10 along one cut line 605 creates two loops 607, with further cuts creating further loops 607. In preferred embodiments the line of stitching 604 is parallel to the fold line 601. In preferred embodiments the angle between the line of stitching 604 and the cut lines 605 is 90 degrees. This results in uniformity so that the loops 607 are all the same height/width.

Figure 16:
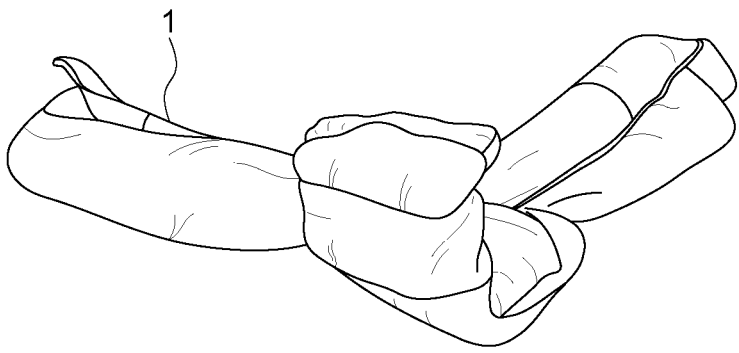
FIG. 16 shows a further perspective view of the snuffle toy according to an aspect of the invention.

Returning to FIG. 7, the method 100 optionally further includes placing one or more items on or in the snuffle toy 1 (step 107 in FIG. 7; see also FIG. 8); rolling the snuffle toy 1 along a direction which is perpendicular to the width of the snuffle toy 1 (step 108 in FIG. 7; see also FIGS. 9-15); and tying the rolled snuffle toy 1, for example in an overhand knot (step 108; see also FIG. 16). The rolled and tied snuffle toy 1, shown in FIG. 16, can be used in enrichment activities which can help to reduce separation anxiety and to provide mental stimulation for dogs, for example during periods when dogs are left alone while their owners are at work.

In use, the snuffle toy 1 provides dogs with a mentally and physically stimulating activity that is adaptable to the individual needs and intellect of a particular dog. The snuffle toy 1 provides value as there are a wide variety of uses, all of which will keep the dog engaged for significant periods of time. The level of mental and physical stimulation for dogs provided by the snuffle toy 1 can be personalised to the needs and abilities of the dog due to the range of adaptations that are possible. The snuffle toy 1 can provide a different challenge for dogs each time they use it, even when used in the same adaptation (loose fold, roll, overhand/single knot, double knot, etc.). The snuffle toy 1 can give dogs a genuinely difficult problem that requires a significant amount of time to complete, slowly releasing rewards throughout the process. As a result of the personalised enrichment provided, use of the snuffle toy 1 will improve wellbeing, whilst also helping to relieve the boredom suffered by a dog during periods of separation from their owners.

The difficulty of the task presented to a dog using the snuffle toy 1 can be adjusted as follows. Initially one or more treats can be placed simply on top of the snuffle toy 1 (i.e. on the body portion 2—see e.g. FIG. 9). The dog will see the treats and retrieve them quickly. At this point the dog will associate the snuffle toy 1 with rewards.

To increase the difficulty of obtaining rewards, items such as dog treats can be placed in or on the snuffle features 3, for example in the pockets 4, 5 or in the loops of the snuffle rows 6, or between snuffle rows. At this point the dog must use a combination of paw and nose/teeth in order to obtain the rewards.

Next, the snuffle toy 1 can be folded with dog treats either placed on the body portion 2 or in or on the snuffle features 3. For example, a user can fold the snuffle toy 1 along its length or its width. Folding multiple times can also adjust the difficulty.

To increase the difficulty of retrieving rewards further, dog treats can be placed on the body portion 2 or in or on the snuffle features 3 before the snuffle toy 1 is rolled into a roll which is tight or loose, depending on the ability of the dog. To obtain the rewards from this configuration, the dog will need to use combination of paw and nose/teeth in order to unroll the toy and obtain the rewards. Rolling along different directions can prevent the dog from becoming too familiar with how to obtain the treats quickly. It is possible to create easier initial rolls to help the dog understand the concept.

For a further increase in the difficulty, items such as dog treats can be placed on the body portion 2 or in or on the snuffle features 3 before the snuffle toy 1 is rolled into a tight roll and tied in a knot which is tight or loose, depending on the ability of the dog. To obtain the rewards from this configuration, the dog will need to untie and unroll the snuffle toy 1, using a combination of paw and nose/teeth in order to obtain the rewards.

The thin material used in the snuffle toy 1 allows for the tying of a tight knot that is difficult (but not impossible) for a dog to untie. Tying the snuffle toy 1 in a knot results in a dog toy with a level of complexity that will keep the dog engaged and stimulated for significantly longer periods than prior art solutions. More complicated knots can adjust the difficulty further. As the shape of the material is rectangular, this means that the finished rolled up length may be of different sizes, depending on which option is chosen. A shorter roll results if the toy 1 is rolled along its length. Conversely, a longer roll results if the toy 1 is rolled along its width. For the longer roll, it is possible to tie a double knot, which is harder for a dog to open.

The snuffle toy 1 is suited for dogs of all intellects. Some dogs will be very adept at figuring out how to untie the single knot and will require the double knot to adequately stimulate them (or one of the other highlighted harder methods). Other dogs will not be able to untie a knot and therefore more basic options may be appropriate for these dogs. As particular dogs become comfortable with the easier options, it is possible to progress the dog on to the harder 'stages', to increase and maintain challenge. For many dogs, the time to retrieve all treats and complete the activities varies between 10-30 minutes for the easier activities and up to an hour for the more challenging activities. The adaptability of the snuffle toy 1 means that when a dog becomes used to a particular activity and starts to figure it out more easily or quickly, the challenge can be adapted, meaning that significant time is still required. The snuffle toy 1 effectively addresses the need for mental and physical stimulation, relieving separation anxiety and boredom in dogs. The snuffle toy 1 offers a long-lasting and engaging solution that improves dogs' well-being. The snuffle toy 1 caters to the evolving needs of dog owners in a dog-centric society.

As will be understood by the skilled person, the example embodiments presented above can be modified in a number of ways without departing from the scope of the invention. For example, the snuffle toy 1 may be 80 cm wide and formed from a single sheet of material 10 that is 80 cm wide and 160 cm long. The snuffle toy 1 and/or sheet of material 10 may have a shape other than rectangular, for example square or circular. The sheet of material 10 may include a plurality of layers of fabric. The snuffle toy 1 is preferably formed from a very fine 'quick-dry' micro-fibre material. This is hygienic as it allows the cloth to be washed and will not leave residue between fibres (as is typically found in a towel designed for human domestic use).

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

What is claimed is:

1. A snuffle toy for retaining or concealing items, the snuffle toy comprising a body portion and one or more snuffle features, wherein the snuffle toy is formed of a single, continuous sheet of material such that the body portion and the one or more snuffle features are integrally formed and the single, continuous sheet of material provides both the one or more snuffle features and the body portion, wherein the one or more snuffle features comprise at least one dual sided pocket, wherein the at least one dual sided pocket comprises a front opening located on the front side of the snuffle toy and a rear opening located on the rear side of the snuffle toy, wherein the at least one dual sided pocket is formed by two folds in the single, continuous sheet of material and two lines of stitching which extend part way along the single, continuous sheet of material, and wherein the snuffle toy is configured to be folded, rolled and tied in a knot to conceal the items within the snuffle toy.

2. A snuffle toy according to claim 1, wherein the single, continuous sheet of material is a sheet of fabric.

3. A snuffle toy according to claim 1, wherein the snuffle toy comprises a plurality of snuffle features.

4. A snuffle toy according to claim 1, wherein the one or more snuffle features comprises a plurality of pockets.

5. A snuffle toy according to claim 1, wherein the snuffle features comprise at least one single sided pocket.

6. A snuffle toy according to claim 5, wherein the at least one single sided pocket is formed at a peripheral end of the snuffle toy.

7. A snuffle toy according to claim 1, wherein the snuffle features comprise at least one snuffle row and wherein the at least one snuffle row comprises a plurality of loops.

8. A snuffle toy according to claim 7, wherein the snuffle features comprise a plurality of snuffle rows.

9. A snuffle toy according to claim 1, wherein the snuffle toy comprises one or more items retained or concealed in the snuffle toy.

10. A snuffle toy according to claim 1, wherein the snuffle toy is folded, rolled and/or tied.

11. A snuffle toy according to claim 1, wherein the at least one dual sided pocket is formed by:

folding the single, continuous sheet of material along a first fold line such that a first portion of material overlaps a second portion of material;

folding the single, continuous sheet of material along a second fold line such that the second portion of material overlaps a third portion of material; and sewing the folded sheet of material along at least two lines of stitching such that the first, second and third portions are attached, a first pocket is formed between the first portion of material and the second portion of material, a second pocket is formed between the second portion of material and the third portion of material, and each pocket of material is formed between the at least two lines of stitching.

12. A snuffle toy according to claim 11, wherein the two lines of stitching are parallel.

13. A snuffle toy according to claim 12, wherein an angle exists between the lines of stitching and the fold lines, and wherein the angle between the lines of stitching and fold lines is 90 degrees.

14. A snuffle toy according to claim 7, wherein the at least one snuffle row is formed by:

folding the single, continuous sheet of material along a fold line such that a first portion of material overlaps a second portion of material;

sewing the folded sheet of material along one line of stitching such that the first portion of material is attached to the second portion of material and a loop is formed by the first portion of material and the second portion of material; and cutting the single, continuous sheet of material along at least one cut line.

15. A snuffle toy according to claim 14, wherein an angle exists between the line of stitching and the at least one cut line, and wherein the angle between the line of stitching and the cut line is 90 degrees.

* * * * *